Feb. 20, 1934.  L. H. HEUER  1,947,715
HOSE CLAMP
Filed Feb. 6, 1933
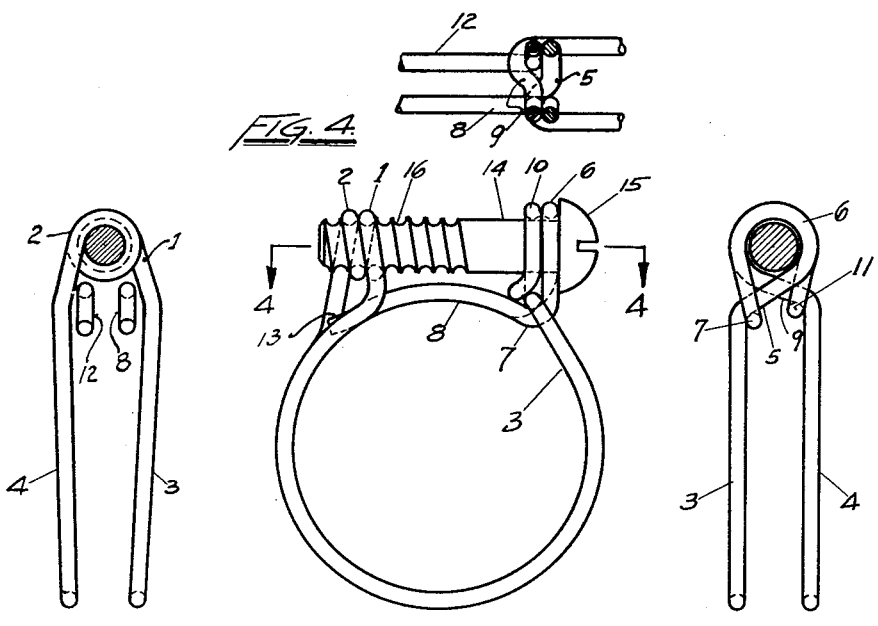
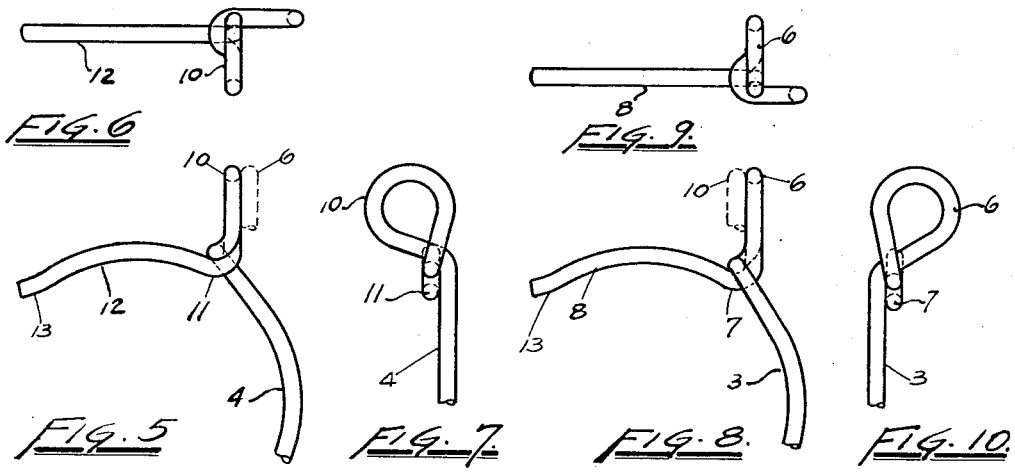
LAWRENCE H. HEUER.
INVENTOR
BY Samuel Weisman
ATTORNEY Patented Feb. 20, 1934

1,947,715

UNITED STATES PATENT OFFICE

1,947,715

HOSE CLAMP

Lawrence H. Heuer, Detroit, Mich., assignor to L. A. Young Spring and Wire Corporation, Detroit, Mich., a corporation of Michigan Application February 6, 1933. Serial No. 655,342

5 Claims. (Cl. 24—19)

The present invention pertains to a novel hose clamp, and the principal object is to provide a device of this character having its body parts consisting entirely of wire and shaped by means of bending operations. In other words, no auxiliary parts are required for receiving the clamping screw, and no welding or threading operations are employed.

The encircling part of the clamp is in the nature of a ring, and the screw receiving parts consist of coils or eyes formed in a plane perpendicular to that of the body. In previous devices of this general character, the screwhead tends to expand or unwind at least one of the eyes when turned against the same in drawing the clamp. The head of the screw thus tends to enter and pass through the coil, thereby destroying the clamp for all practical purposes.

Another object of the invention is to overcome this difficulty and is accomplished by locking the eye to the body of the clamp in such a manner that it resists the frictional turning action of the screwhead. More particularly, the lock is made by continuing the wire from the eye beneath a wire portion extended from the body ring. In the case of a right hand screw the lock is positioned at the left of the eye that is engaged directly by the screwhead and thus the lock opposes the spreading of the eye under clockwise torsion. In the present instance two eyes are provided at the head of the screw, and the locking principle is embodied in each.

At the other end of the encircling body portion, which in fact is in the form of a major arc, the wire is preferably formed with a helix on an axis perpendicular to that of the arc. The clamping screw is passed through the eye and helix and has the same pitch as the helix so that the helix serves as a nut for the screw without further modification.

The invention is fully disclosed by way of example in the following description and in the accompanying drawing in which Figure 1 is a side elevation of the clamp;

Figures 2 and 3 are elevations of the clamp at the ends of the clamping screw;

Figure 4 is a partial section on the line 4—4 of Figure 1;

Figure 5 is a detail elevation showing a portion of one of the body coils and parts directly associated therewith;

Figures 6 and 7 are respectively a plan view and a side elevation corresponding to Figure 5;

Figure 8 is a detail elevation, similar to Figure 5, of the other body coil; and Figures 9 and 10 are respectively a plan view and a side elevation corresponding to Figure 8.

Reference to these views will now be made by use of like characters which are employed to designate corresponding parts throughout.

The body of the clamp consists of a piece of wire which may be regarded as formed with two co-axial coils 1 and 2 forming a helix substantially mid-way between the ends of the wire. From the coil 1, the wire is bent to form an incomplete circle or major arc 3, likewise, a similar body coil 4, is formed as a continuation of the eye 2. The coils 3 and 4 are disposed in substantially parallel planes and the eyes 1 and 2 are in planes substantially perpendicular to the planes of the body coils 3 and 4.

From the remaining end of the coil 3, that is, the end opposite the eye 1, the wire is bent transversely of the coil 3 as indicated by numeral 5 and is then coiled to form an eye 6 in the transverse plane. The wire is continued beneath the transverse portion 5 at the inner surface of the body coil 3, as shown by the numeral 7 in Figures 1, 3, 8 and 10. From this point the wire takes the form of a curved finger 8 co-operating with the coil 3 to complete a circle and terminates beneath the eyes 1 and 2.

In like manner, the remaining end of the body coil 4 is bent transversely at 9, crossing the portion 5 and bent to form an eye 10 engaging the inner side of the eye 6. The wire is then looped at 11 under the transverse portion 9 at the inner side of the coil 4 and from this point is continued in the form of a curved finger 12 which is parallel and similar to the finger 8. The free ends of the fingers 8 and 12, which are also the extremities of the wire, may be bent slightly upward as indicated by the numeral 13, in order to avoid cutting into the hose when the clamp is under pressure.

The clamp is tightened by means of a screw 14 passing through eyes 6, 10, 1 and 2 and having its head 15 in engagement with the eye 6. The pitch of the screw thread 16 is concave and equal to that of the helix formed by the eyes 1 and 2 so that the helix serves as a nut for the screw without being tapped.

Assuming that the screw 14 is right handed, it will be seen that the turning of the head 15 under pressure against the eye 6 tends to unwind or enlarge the same, whereby the head might eventually pass through the eye and destroy the clamping effect. Such action is, however, prevented by the lock 7 at the left hand side of the head which prevents the eye from becoming distorted. The lock 11 between the coils 4 and 10 at the right hand side of the screwhead prevents these parts from being pulled apart under pressure and at the same time enables the axial movement of the eye 10 to contract the coil 4. Also, the eye 10 serves as a backing or reinforcement for the eye 6, thereby forming a rigid structure that does not buckle too readily.

As the eyes 1 and 2 are drawn by the screw toward the eyes 6 and 10, they come into engagement with the curved fingers 8 and 12 and press them against the hose within the clamp. This action tends to distribute the clamping pressure uniformly around the hose. At the same time, however, the slightly bent extremities 13 of the fingers prevent cutting into the hose. The pitch of the screw thread is rather large to enable rapid assembly and tightening of the clamp.

Although a specific embodiment of the invention has been illustrated and described, it will be understood that various alterations in the details of construction may be made without departing from the scope of the invention as indicated by the appended claims.

What I claim is:

1. A hose clamp comprising a wire having a portion formed as a major arc, an eye formed at one end of said arc in a plane transverse of that of the arc, said eye originating in a transverse portion in immediate continuation of said arc and terminating at said transverse portion, the wire being continued from the terminal of said eye beneath said transverse portion to interlock therewith, a screw passing through said eye and having a head bearing against said eye, the wire being coiled at the other end of said major arc transversely of said arc to form a helix, the thread of said screw being dimensioned to receive the convolutions of said helix.

2. A hose clamp comprising a wire having a portion formed as a major arc, an eye formed at one end of said arc in a plane transverse of that of the arc, said eye originating in a transverse portion in immediate continuation of said arc and terminating at said transverse portion, the wire being continued from the terminal of said eye beneath said transverse portion to interlock therewith and to the other end of said arc, the wire being coiled at the other end of said major arc and transversely of said arc to form a helix immediately over the last named continued part of the wire, and a screw passing through said eye and having a head bearing against said eye, the threads of said screw being adapted to receive the convolutions of said helix.

3. A hose clamp comprising a wire bent to form a helix at a substantial distance from its ends, said wire being shaped to form a pair of equal and parallel major arcs continuing respectively from the ends of said helix in planes substantially parallel to the axis of the helix, eyes formed on the concluding ends of said arcs in opposition to and substantially co-axial with said helix, fingers extending from said eyes and slung under the originating parts of said eyes to lock with said arcs, and a screw passing through said eyes and helix and having a head bearing against one of said eyes, the threads of said screw being dimensioned to receive the convolutions of said helix.

4. A hose clamp comprising a wire bent to form a helix at a substantial distance from its ends, said wire being shaped to form a pair of equal and parallel major arcs continuing respectively from the ends of said helix in planes substantially parallel to the axis of the helix, eyes formed on the concluding ends of said arcs in opposition to and substantially co-axial with said helix, fingers extending from said eyes and slung under the originating parts of said eyes to lock with said arcs, said fingers co-operating with said major arcs to form complete circles and extending beneath said helix, and a screw passing through said eyes and helix and having a head bearing against one of said eyes, the threads of said screw being dimensioned to receive the convolutions of said helix.

5. A hose clamp comprising a wire bent to form a major arc with an eye at one end thereof in a plane perpendicular to that of the arc, a screw passing through said eye and having a head bearing against said eye, a helix formed at the other end of the arc and having convolutions adapted to be received in the threads of said screw, said eye being interlocked with said arc against distortion by the pressure and turning of said head against the eye.

LAWRENCE H. HEUER.